(12) United States Patent
Collins, II

(10) Patent No.: US 11,370,449 B2
(45) Date of Patent: Jun. 28, 2022

(54) DRIVER IDENTIFICATION AND IDENTIFICATION SYSTEMS AND METHODS

(71) Applicant: Gentex Corporation, Zeeland, MI (US)

(72) Inventor: James D. Collins, II, Grandville, MI (US)

(73) Assignee: GENTEX CORPORATION, Zeeland, MI (US)

(*) Notice: Subject to any disclaimer, the term of this patent is extended or adjusted under 35 U.S.C. 154(b) by 283 days.

(21) Appl. No.: 16/445,826

(22) Filed: Jun. 19, 2019

(65) Prior Publication Data

US 2019/0389485 A1 Dec. 26, 2019

Related U.S. Application Data

(60) Provisional application No. 62/687,476, filed on Jun. 20, 2018.

(51) Int. Cl.
| | |
|---|---|
| *B60W 50/12* | (2012.01) |
| *B60W 40/08* | (2012.01) |
| *G06F 21/32* | (2013.01) |
| *G06K 9/00* | (2022.01) |
| *G06V 20/59* | (2022.01) |

(52) U.S. Cl.
CPC ............ *B60W 50/12* (2013.01); *B60W 40/08* (2013.01); *G06F 21/32* (2013.01); *G06V 20/59* (2022.01); *B60W 2040/0809* (2013.01); *B60W 2540/043* (2020.02)

(58) Field of Classification Search
CPC .......... G06F 21/30; G06F 21/31; G06F 21/32; B60W 2540/043; B60W 2040/0809; B60W 50/12; H04M 1/72577; H04M 1/72569; H04M 1/6075; H04W 48/04; H04W 48/06
See application file for complete search history.

(56) References Cited

U.S. PATENT DOCUMENTS

| | | |
|---|---|---|
| 5,708,415 A | 1/1998 | Van Lente et al. |
| 5,854,593 A | 12/1998 | Dykema et al. |
| 6,091,343 A | 7/2000 | Dykema et al. |
| 6,144,315 A | 11/2000 | Flick |
| 6,572,233 B1 | 6/2003 | Northman et al. |
| 8,237,909 B2 | 8/2012 | Ostreko et al. |

(Continued)

*Primary Examiner* — Russell Frejd
*Assistant Examiner* — Sara J Lewandroski
(74) *Attorney, Agent, or Firm* — Price Heneveld LLP; Brian James Brewer

(57) ABSTRACT

An identification system in communication with a vehicle control system comprises a communication circuit configured to communicate with a remote server and at least one scanning apparatus configured to capture a biometric data. A controller is in communication with the communication circuit and the scanning apparatus. The controller is configured to receive a request for a security authorization, capture the biometric data with the scanning apparatus, and compare the biometric data to authentication data in an identification profile. Based on the comparison, the controller is further configured to authenticate a vehicle operator and communicate with a mobile device associated with the vehicle operator via the communication circuit. The communication with the mobile device is configured to limit or restrict operations of the mobile device.

2 Claims, 5 Drawing Sheets

(56) References Cited

U.S. PATENT DOCUMENTS

| | | |
|---|---|---|
| 8,339,526 B2 | 12/2012 | Minikey, Jr. et al. |
| 8,411,245 B2 | 4/2013 | Lee et al. |
| 2006/0036358 A1 | 2/2006 | Hale et al. |
| 2007/0216516 A1* | 9/2007 | Ghabra .............. G07C 9/00182 340/5.74 |
| 2011/0032093 A1 | 2/2011 | Miller et al. |
| 2012/0208520 A1 | 8/2012 | Howarter et al. |
| 2014/0358376 A1* | 12/2014 | Phelan ................. B60W 40/08 701/41 |
| 2015/0054934 A1* | 2/2015 | Haley .................. G06V 40/172 348/78 |
| 2016/0224827 A1* | 8/2016 | Haley ..................... G07C 5/008 |
| 2016/0227020 A1* | 8/2016 | Tadayon ............... H04W 24/08 |
| 2017/0054842 A1* | 2/2017 | Choi ..................... H04W 4/021 |
| 2017/0279957 A1* | 9/2017 | Abramson et al. . H04M 1/6075 |
| 2018/0052564 A1* | 2/2018 | Koseki ................. G06F 3/0412 |
| 2018/0124233 A1* | 5/2018 | Abramson .............. H04W 4/48 |
| 2019/0057562 A1 | 2/2019 | Peterson et al. |
| 2019/0176752 A1* | 6/2019 | Cermak .................. E05F 15/00 |
| 2019/0270459 A1* | 9/2019 | Williams .......... H04M 1/72463 |

* cited by examiner

DRIVER IDENTIFICATION AND IDENTIFICATION SYSTEMS AND METHODS

CROSS-REFERENCE TO RELATED APPLICATION

This application claims the benefit under 35 U.S.C. § 119(e) of U.S. Provisional Patent Application No. 62/687,476, filed Jun. 20, 2018, entitled "DRIVER IDENTIFICATION AND IDENTIFICATION SYSTEMS AND METHODS," which is incorporated herein by reference in its entirety.

TECHNOLOGICAL FIELD

The present disclosure relates generally to an electronic accessory for a vehicle and, more particularly, relates to a vehicle accessory configured to control an operation or access to a mobile electronic device.

SUMMARY

In one aspect of the present disclosure, an identification system in communication with a vehicle control system is disclosed. The identification system comprises a communication circuit configured to communicate with a remote server and at least one scanning apparatus configured to capture a biometric data. A controller is in communication with the communication circuit and the scanning apparatus. The controller is configured to receive a request for a security authorization, capture the biometric data with the scanning apparatus, and compare the biometric data to authentication data in an identification profile. Based on the comparison, the controller is further configured to authenticate a vehicle operator and communicate with a mobile device associated with the vehicle operator via the communication circuit. The communication with the mobile device is configured to limit or restrict operations of the mobile device limiting distractions associated with the mobile device for the vehicle operator.

In another aspect of the present disclosure, a method for controlling a mobile device operating proximate to a vehicle is disclosed. The method comprises identifying an operating state of the vehicle and activating a scanning routine of a scanning apparatus. The method further comprises authenticating a vehicle operator based on authentication data captured by a scanning apparatus and selecting an identification profile of the vehicle operator based on the authentication. A control instruction is communicated to a mobile device associated with the vehicle operator. The control instruction is configured to restrict an operation of the mobile device.

In yet another aspect of the present disclosure, an identification system in communication with a control system of a vehicle is disclosed. The identification system comprises a communication circuit configured to communicate with a plurality of mobile devices. The system further comprises at least one scanning apparatus configured to capture a biometric data. A controller is in communication with the communication circuit and the scanning apparatus. The controller is configured to control the scanning apparatus to capture the biometric data and compare the biometric data to authentication data in an identification profile. The controller is further configured to authenticate a vehicle operator based on the authentication data and communicate a control instruction to a first mobile device of the mobile devices associated with the vehicle operator via the communication circuit. The control instruction is configured to cause a restricted operation of the first mobile device.

These and other features, advantages, and objects of the present device will be further understood and appreciated by those skilled in the art upon studying the following specification, claims, and appended drawings.

DETAILED DESCRIPTION OF EMBODIMENTS

Figure 1:
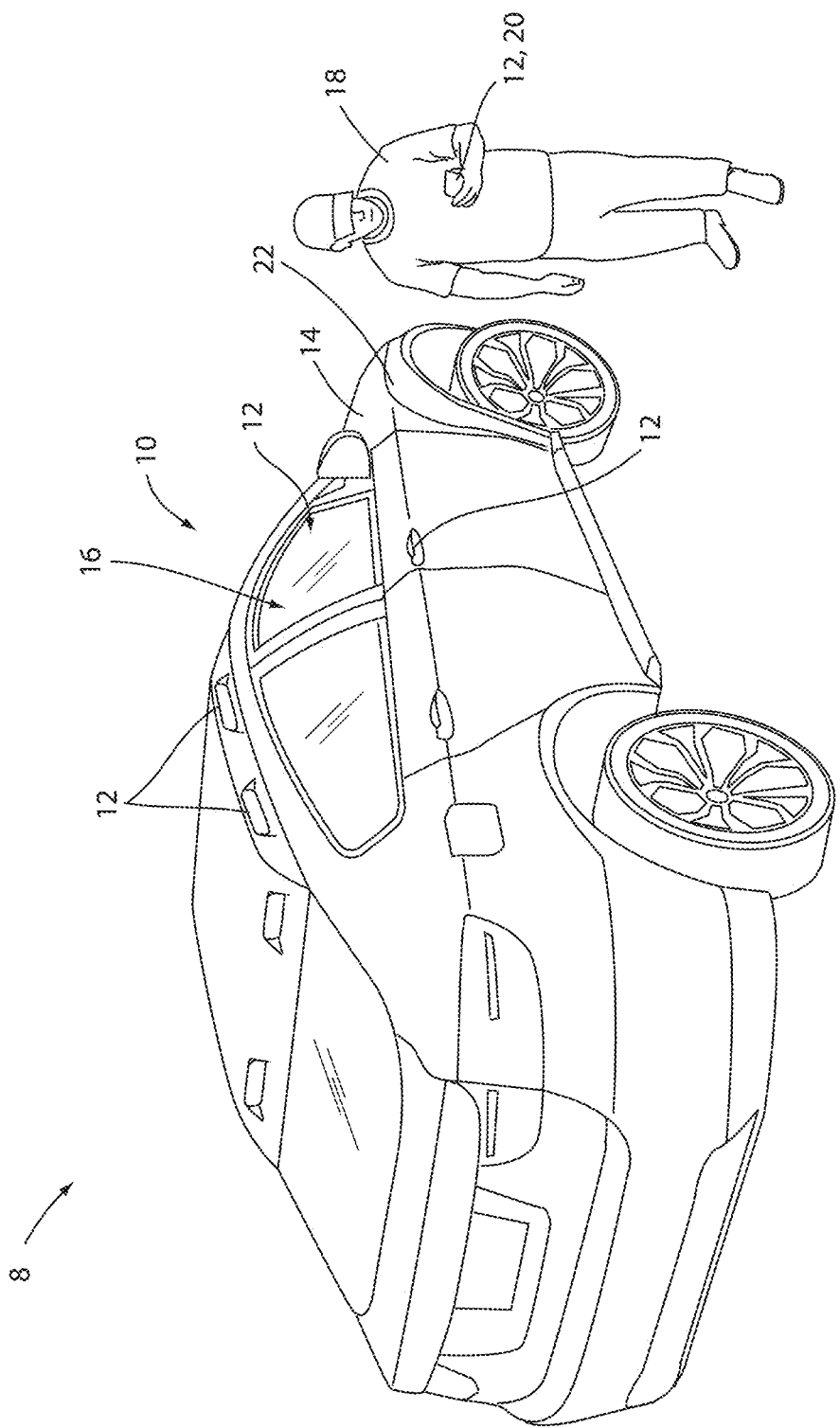
FIG. 1 is a projected view of a vehicle comprising an identification system.

For purposes of description herein, the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In various embodiments, the disclosure provides for a vehicle accessory in the form of an occupant identification module. The occupant identification module may be incorporated as a part of an identification system for the vehicle. The identification system may be configured to capture identifying information for an occupant in order to authorize specific vehicle functions or operations. Additionally, in an exemplary embodiment, the vehicle accessory may be configured to communicate with a mobile electronic device. Based on the identification of an operator or passenger of the vehicle, the vehicle accessory may communicate with the mobile device to restrict or control usage of the mobile device.

In some embodiments, the vehicle accessory may be configured to only limit or restrict the usage of a mobile device associated with an operator of the vehicle. In this way, the vehicle accessory may reduce distractions to the operator that may be attributed to the mobile device. In some embodiments, the vehicle accessory may comprise a scanning apparatus configured to detect one or more identifying characteristics of an occupant or operator of the vehicle. The scanning apparatus may be incorporated in one or more vehicle systems as further provided in the following detailed description.

Referring to FIG. 1, a projected view of a vehicle 8 comprising an identification system 10 is shown. The vehicle 8 may correspond to a conventional passenger vehicle, commercial transportation vehicle, or a wide variety of transportation vehicles. The identification system 10 may comprise a scanning apparatus 12 incorporated on an exterior portion 14 and/or disposed within an interior cabin 16 of the vehicle 8. Accordingly, the scanning apparatus 12 may be flexibly configured to provide for a collection or capture of scanning data or biometric data that may be utilized by the identification system 10 to process an identification of a potential occupant 18 or operator of the vehicle 8.

In some embodiments, the identification system 10 may be in communication with a mobile device 20. The mobile device 20 may correspond to a portable electronic device, such as a smart phone, tablet, personal data assistant (PDA), laptop, or various other electronic devices that may be utilized in the vehicle 8. The identification system 10 may be configured to communicate with and control or restrict access to the mobile device 20 while the vehicle 8 is in operation. Additionally, the identification system 10 may be in communication with a vehicle control system 22. In this way, the identification system 10 may be configured to identify an operational state of the vehicle 8 and control one or more features, operations, or applications of the mobile device 20 based on the state or operating condition of the vehicle 8. In some embodiments, the identification device may also be configured to control a variety of systems and subsystems of the vehicle 8 (e.g. an engine control unit, a navigation system, a vehicle guidance system, a cabin control module, etc.).

As discussed herein, the operation of the mobile device 20 may be completely or partially restricted by the system 10. For example, in some implementations, the applications or operations of the mobile device 20 of the operator of the vehicle 8 may be limited to one or more predetermined applications and/or functions. The applications and/or functions may include functions that are pre-approved for use with operation of the vehicle 8. In this way, the identification system 10 may be configured to control the operations of a first mobile device assigned or associated with the operator of the vehicle 8 to a first set of predetermined operations or complete deactivation. Additionally, the identification system 10 may be configured to control the operations of a second mobile device assigned or associated with the operator of the vehicle 8 to a second set of predetermined operations or full operation. In this way, the system 10 may be configured to allow a passenger to continue to utilize a second mobile device while restricting access of the operator to the first mobile device.

The scanning apparatus 12 may correspond to a biometric scanner configured to capture biometric data or scanning data of an occupant 18 or a potential occupant of the vehicle 8. For example, the scanning apparatus 12 may correspond to an iris imager or scanner, fingerprint scanner, face imager or scanner, voice scanner/recorder, or various other scanning devices. In some embodiments, scanning apparatus 12 may include or incorporate a plurality of the aforementioned types of apparatuses. The scanning data captured by and/or associated with the scanning apparatus 12 may be saved in a local memory or remote server. The remote server or database may be accessible by the identification system 10 via a wireless communication interface. In this way, the identification system 10 may access the local memory or the remote server to search and match scanning data or biometric data to an identification profile to identify the occupant 18. For clarity, a passenger, rider, and operator of the vehicle 8 will generally be referred to as the occupant 18 of the vehicle 8.

As discussed herein, the terms identification and authentication may generally refer to an analysis completed by the identification system 10 configured to identify the occupant 18 or a potential occupant of the vehicle 8. The disclosure provides for various embodiments configured to provide at least one authentication routine configured to securely indicate an identity of the occupant 18. Based on the identity, the identification system 10 may be configured to identify and distinguish an operator of the vehicle 8 from additional passengers. In this way, the identification system 10 may identify the operator of the vehicle 8 and control or restrict operations of the operator's mobile device (e.g. the mobile device 20), while allowing additional mobile devices in the vehicle 8 to continue operating without restriction. As previously discussed, the identification system 10 may be configured to communicate with the vehicle control system 22 and control the operation of the mobile device 20 in response to specific operating conditions of the vehicle 8 (e.g. vehicle in drive, vehicle in motion, etc.). In this way, the identification system 10 may be configured to identify an operational state of the vehicle 8 and control one or more features, operations, or applications of the mobile device 20 of the operator of the vehicle 8 based on the state or operating condition of the vehicle 8.

The identification profile may be utilized to identify the occupant 18 and the operator of the vehicle 8. In some embodiments, the identification system 10 may also access and or update a variety of preferences and/or operational parameters of the vehicle 8 based on the identification profile. For example, the identification system 10 may be configured to authenticate the occupant 18 and communicate the authentication to the vehicle control system 22. In response to the authentication of the occupant 18, the control system 22 may be configured to receive or identify a plurality of occupant parameters associated with the occupant 18 and the identification profile. The occupant parameters may include, but are not limited to, one or more of the following settings or preferences: a personal mobile device (e.g. the mobile device 20), a seat position, preset configurations (e.g. stations, light/display settings), themes, colors, control preferences, and/or any other configurable attributes of the vehicle 8. The occupant parameters may also include financial information associated with occupant 18 of the vehicle 8, including, e.g., information identifying a payment account, an authorization to apply a charge to the payment account, and a predetermined spending limit indicated for the payment account.

In some embodiments, the identification system 10 may be configured to access and control various home automation services based on the identification profile of the occupant 18. For example, the identification system 10 may correspond to or be in communication with a trainable wireless accessory configured to control a remote electronic system or device. In this way, the identification system 10 may be operable to access encoding and/or security information from or associated with the identification profile of the occupant 18. In this way, the identification system 10 may access and load programming instructions for a trainable wireless accessory to control a variety of remote devices based on the authentication of the occupant 18. Remote devices may include, but are not limited to, motorized barriers, locks, lights, and a variety of so-called "smart-home" devices. In an exemplary embodiment, the security accessory may correspond to a Homelink® trainable transceiver and may be constructed according to one or more embodiments disclosed in U.S. Pat. Nos. 6,091,343; 5,854,593 or 5,708,415, which are herein incorporated by reference in their entirety.

Figure 2:
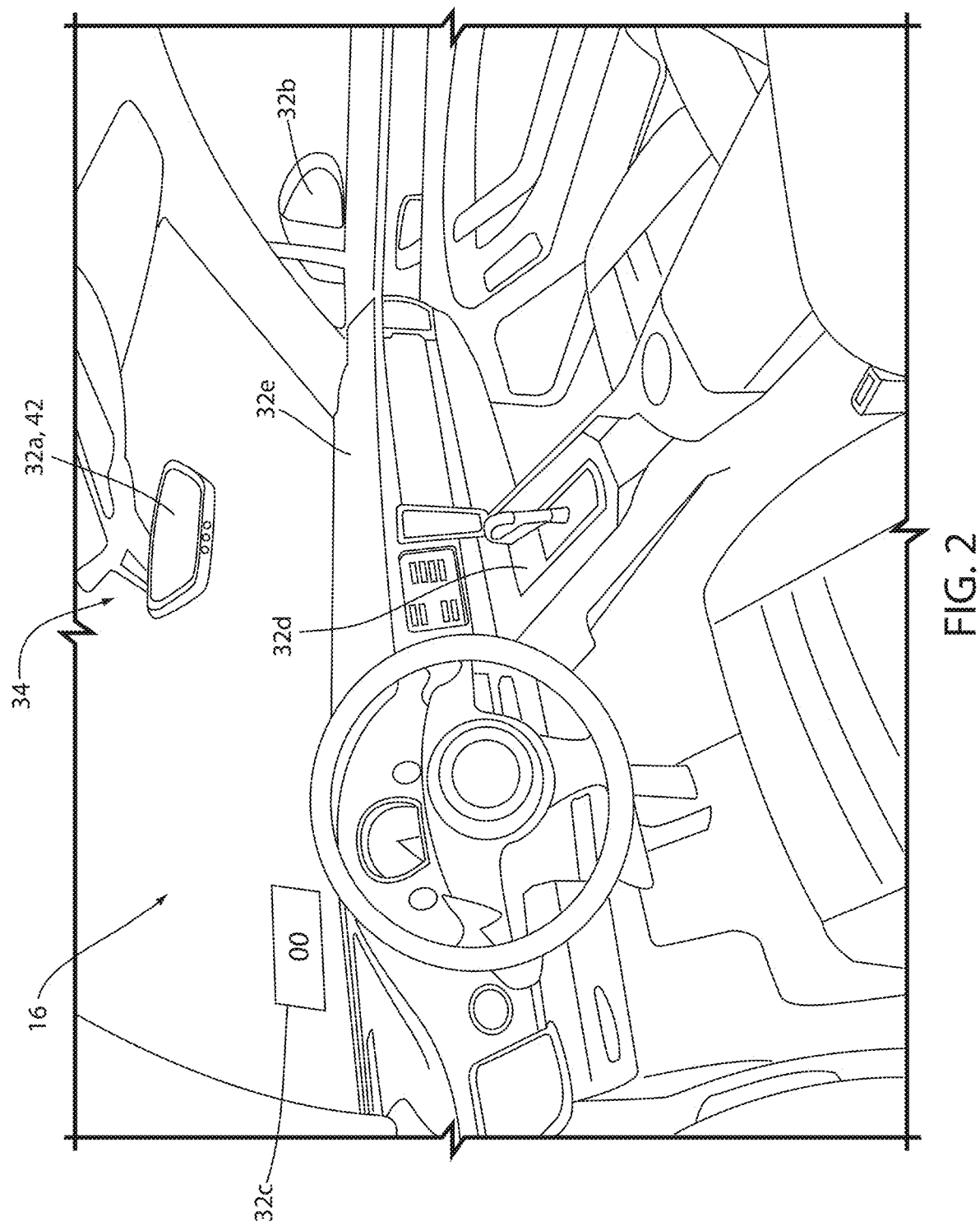
FIG. 2 is a projected view of a vehicle interior demonstrating an identification system configured to identify an occupant of a vehicle.

FIG. 2 demonstrates the passenger cabin 16 of the vehicle 8. Referring now to FIGS. 1 and 2, in some embodiments, a scanning apparatus 12 may be disposed within the passenger cabin 16 of the vehicle 8. In some embodiments, a scanning apparatus 12 may be in communication with the identification system 10 and configured to capture the scanning data utilized to identify the operator or occupant of the vehicle 8. The scanning apparatus 12 may be incorporated as a component 32 in one or more of an interior rearview mirror 32a, an exterior rearview mirror 32b, a heads-up display 32c, an interior console 32d, a dash 32e, or other locations of the passenger cabin 16. In this way, the scanning apparatus 12 of the identification system 10 may be implemented in a variety of ways to suit a desired application. Accordingly, the disclosure may provide for a variety of solutions that may be applied to by the identification module to control or restrict one or more operations of the mobile device 20.

In various embodiments, the identification system 10 may be configured to utilize one or more communication circuits 34 to transmit or receive data from one or more remote servers or other devices. For example, in some embodiments, a controller of the identification system 10 may be operable to send authentication data, biometric or scanning data, and various other forms of data to a remote server that may be configured to process the data to authenticate or identify an identification profile as discussed herein. Additionally, the controller may be operable to receive an authentication of the occupant 18, an identification profile, or operating parameters or operational privileges for the vehicle 8, or various information related to one or more systems from the remote server.

The biometric and/or scanning data may correspond to various forms of data, which may be configured to capture one or more unique or identifying characteristics of the occupant 18. The biometric data may correspond to image data, audio data, or various forms of sensory data. Such data may be utilized by the controller of the identification system 10 and/or the remote server to process an iris recognition, fingerprint recognition, voice recognition, face recognition, gesture recognition or various forms of biometric processing that may be captured by the scanning apparatus(es) 12. Accordingly, the identification system 10 may be configured to authenticate an identity of the occupant 18 in a variety of ways to suit a desired application.

In implementations that utilize the one or more communication circuits 34 to communicate with the mobile device 20 and/or the remote server, the identification system 10 may be in communication with a communication network operable to connect to a server, the internet, and/or a portal configured to securely communicate information. For example, the identification system 10 and/or the mobile device 20 may comprise one or more communication circuits 34 configured to communicate with a private server (e.g. a security provider). Further details describing the identification system 10, the mobile device 20, and the remote server are discussed in reference to FIG. 5.

Figure 3:
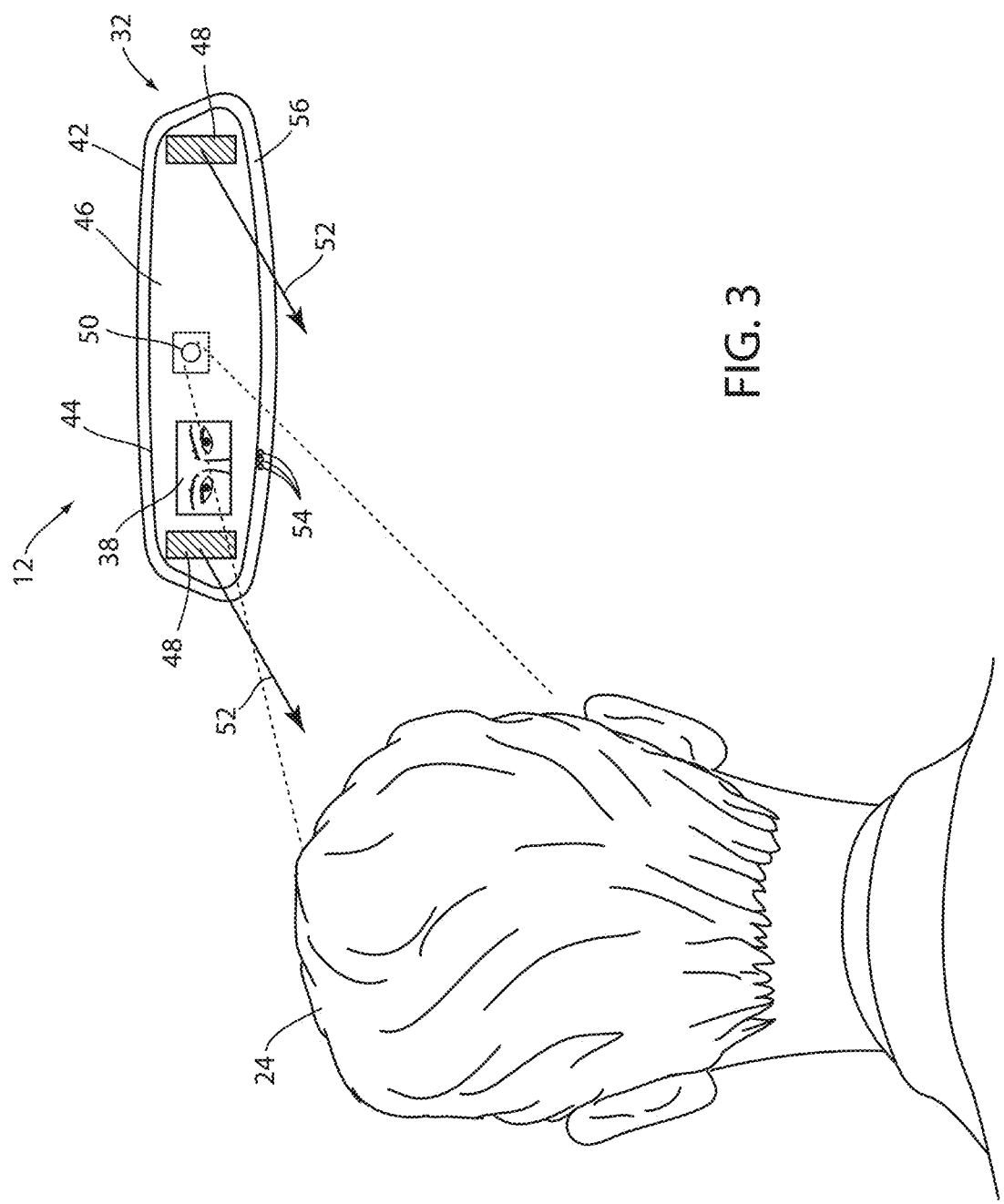
FIG. 3 is a schematic diagram of a scanning apparatus for a vehicle.

Referring now to FIG. 3, an exemplary embodiment of the scanning apparatus 12 is shown. As discussed herein, the scanning apparatus 12 may be operable to perform an identification or authentication function. In an exemplary embodiment, the scanning apparatus 12 is shown incorporated in an interior rearview mirror assembly 42. The mirror assembly 42 may correspond to an electro-optic assembly 44 having an electrochromic (EC) mirror element. The identification function may correspond to an eye-scan-identification function, which may include an iris scan. In this configuration, the scanning apparatus 12 may provide for an interior rearview mirror assembly 42 configured to authenticate an identity of the occupant 18 based on an eye-scan identification function. Additionally, as discussed herein, the identification system 10 may be configured to identify an operator of the vehicle 8 based on an identification by the system 10 and additional factors.

A scanning operation of the scanning apparatus may be initiated by activating an icon representing an "eye," which may be displayed on a display screen 46. The display of the icon may alert the occupant 18 to initiate identification by positioning his or her face in a particular position. The eye-scan-identification function may utilize an infrared illumination emitted toward an eye of the occupant 18 from one or more emitters 48 to illuminate the eye for the identification. Such illumination may be optimized in conditions allowing for a high optical transmittance in the near infrared (NIR) range. In some embodiments, the disclosure may provide for an electrochromic (EC) stack of the electro-optic assembly that may have a high light transmittance in the NIR range, for example, wavelengths of light ranging from 800 nm to 940 nm. Additionally, in some implementations, the electro-optic assembly may comprise a plurality of light sources configured to illuminate at least one iris of the occupant 18 of the vehicle 8.

To provide for the eye-scan-identification function of the identification system 10, an image sensor 50 may be disposed proximate a rear surface of the electro-optic assembly 44. The image sensor 50 may correspond to, for example, a digital charge-coupled device (CCD) or complementary metal-oxide-semiconductor (CMOS) active pixel sensor, although it may not be limited to these exemplary devices. The image sensor 50 may be in communication with at least one emitter 48 via an imaging circuit (e.g. a field-programmable gate array) or controller. The emitter 48 may correspond to a plurality of infrared emitter banks configured to output an emission 52 in the NIR range. Each of the infrared emitter banks may comprise a plurality of light emitting diodes, which may be grouped in a matrix or otherwise grouped and disposed behind a rear surface of the electro-optic device. In this configuration, the scanning apparatus 12 may be configured to illuminate the eyes of the occupant 18 such that the image sensor 50 may capture image data including details of the irises of the eyes.

The display 38 may be disposed in the mirror assembly 42 and may be operable to display the image data received from the image sensor 50 such that the occupant may view the image data. In this configuration, the occupant 18 may adjust a position of the eyes shown on the display 38 to position the eyes such that the scanning data or biometric data may include the necessary features required to identify the occupant. In an exemplary embodiment, the features required to identify the occupant 18 of the vehicle 8 may correspond to features of one or more of the eyes of the occupant 18 (e.g. the irises).

The display 38 may correspond to a partial or full display mirror configured to display an image data through at least a portion of the mirror assembly 42. The display 38 may be constructed utilizing various technologies, for example, LCD, LED, OLED, plasma, digital light processing (DLP) or other display technology. Examples of display assemblies that may be utilized with the disclosure may include U.S. Pat. No. 6,572,233 entitled "Rearview display mirror," U.S. Pat. No. 8,237,909 entitled "Vehicular rearview mirror assembly 42 including integrated backlighting for a liquid crystal display (LCD)," U.S. Pat. No. 8,411,245 entitled "Multi-display mirror system and method for expanded view around a vehicle," and 8,339,526 entitled "Vehicle rearview mirror assembly including a high intensity display," which are incorporated herein by reference in their entirety.

The scanning apparatus 12 may further comprise an indicator 54 in the mirror assembly 42. The indicator 54 may be in communication with the controller and configured to output a signal to identify a state of the scanning apparatus 12 and/or a rearview camera. The indicator 54 may correspond to a light source that may be operable to flash and/or change colors to communicate a state of the scanning apparatus 12. The indicator 54 may correspond to a light emitting diode (LED), and, in an exemplary embodiment, the indicator 54 may correspond to a red, green, and blue (RGB) LED operable to identify the state of the scanning apparatus 12 by outputting one or more colored emissions of light.

The various components of the electro-optic assembly 44 and the scanning apparatus 12 may be contained within a housing 56 of the mirror assembly 42. In this way, the various components discussed herein may be substantially hidden from a view of the occupant 18. Accordingly, the disclosure may provide for various advanced functions from the electro-optic assembly 44 and the scanning apparatus 12 while maintaining an appearance of a conventional rearview mirror.

Figure 4:
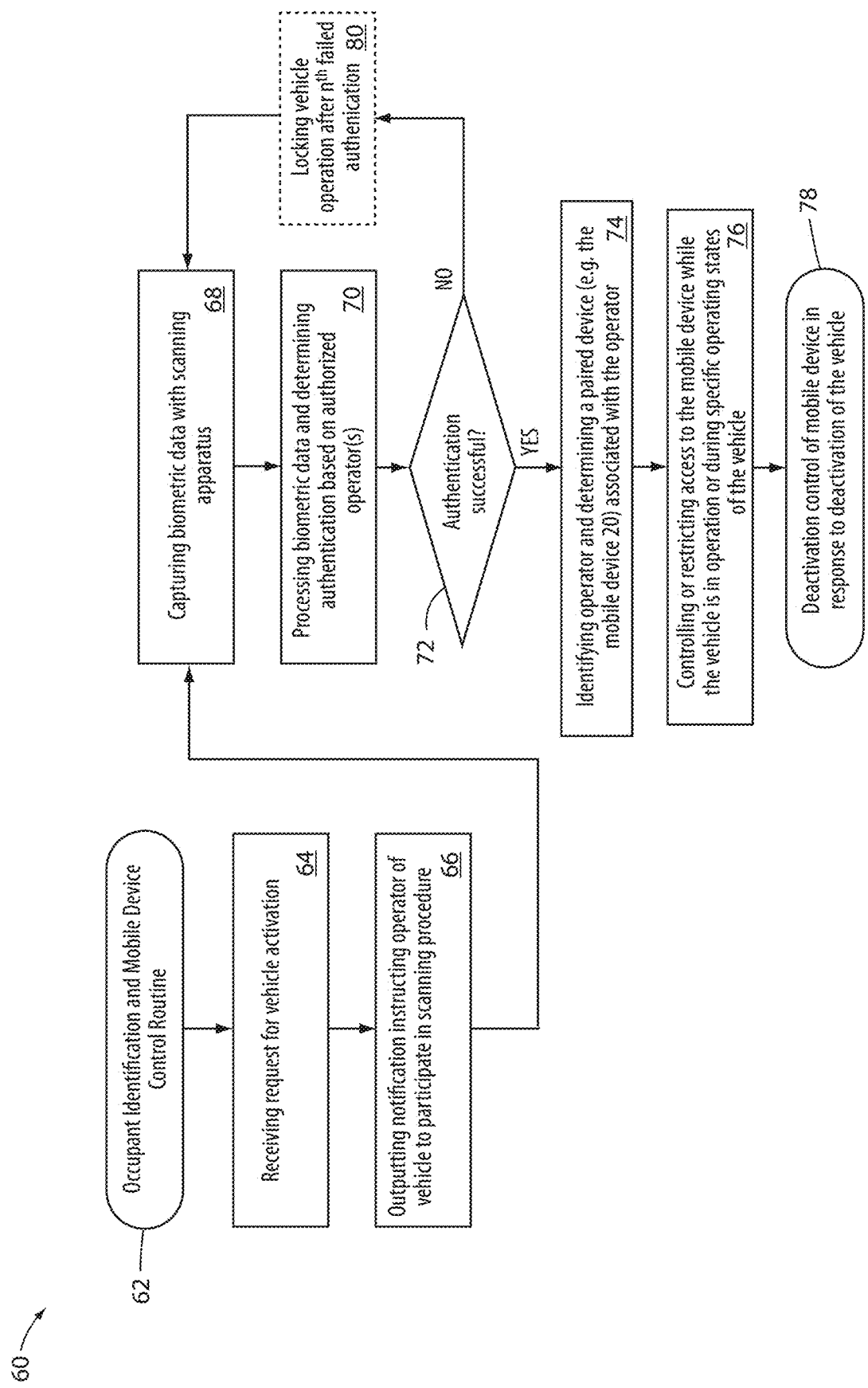
FIG. 4 is a flow chart demonstrating a method for controlling a mobile device via an accessory of the vehicle.

Referring now to FIG. 4, a flow chart demonstrates a method 60 to control the mobile device 20 based on the identification of the occupant 18 or operator of the vehicle 8. The method 60 may begin by initiating an occupant identification routine (62). The routine may begin in response to a request from an operator to activate the vehicle 8 (64). For example, the operator may press an ignition or start button to initiate the vehicle to enter an operating or active configuration. In response to the request for activation, a controller of the system 10 may output a notification instructing the operator of the vehicle 8 to participate in a scanning procedure processed by the scanning device 12 (66). In response to the request for scanning procedure, the method 60 may continue to capture biometric data from the scanning apparatus 12 (68). Once the biometric data is captured, the method 60 may continue by processing the biometric data and determining an authentication for the occupant 18 (70). Further discussion of the identification system 10, the scanning apparatus 12, the communication circuit 34, the controller, and various other components that may be utilized in combination with the scanning apparatus is provided in reference to FIG. 5.

In step 72, the controller may proceed to determine if the authentication is successful or unsuccessful. For example, the authentication may be considered successful if the biometric data captured for the occupant 18 is associated with an authorized user and may proceed to step 74. The authentication may be considered unsuccessful if the biometric data captured for the occupant 18 is not identified as corresponding to an authorized user and may return to step 72 to re-scan or capture the biometric data. If the occupant is not identified as an authorized user, after a predetermined number of failed attempts (e.g. n failed attempts), the controller may lock the authentication process and halt the method 60 and/or operation of the vehicle 8 (76).

Upon successful authentication of the occupant 18, the method 60 may identify the operator of the vehicle 8 and determine a paired device (e.g. the mobile device 20) associated with the operator (74). For example, a specific mobile device may be stored or designated by the identification profile for the user. Once identified, the controller may communicate with the mobile device 20 associated with the operator of the vehicle 8 to control or restrict access to the mobile device 20 while the vehicle 8 is in operation or during specific operating states of the vehicle 8 (76). As previously discussed, the identification system 10 may be in communication with a vehicle control system 22. In this way, the identification system 10 may be configured to identify an operational state of the vehicle 8 and control one or more features, operations, or applications of the mobile device 20 based on the state or operating condition of the vehicle 8. Once an ignition of the vehicle 8 is deactivated, communication between the mobile device 20 and the identification system 10 may be deactivated such that the mobile device 20 is returned to normal or unrestricted operation (78). In this way, the method 60 may limit access to one or more functions to the mobile device 20 associated with the operator of the vehicle 8 throughout operation of the vehicle 8.

In various implementations, the operation of the mobile device 20 may be completely or partially restricted by the system 10. For example, in some implementations, the applications or operations of the mobile device 20 of the operator of the vehicle 8 may be limited to one or more predetermined applications and/or functions. The applications and/or functions may include functions that are pre-approved for use in combination with the operation of the vehicle 8. In this way, the identification system 10 may be configured to control the operations of a first mobile device assigned or associated with the operator of the vehicle 8 to a first set of predetermined operations or complete deactivation. Additionally, the identification system 10 may be configured to control the operations of a second mobile device assigned or associated with the operator of the vehicle 8 to a second set of predetermined operations or full operation. In this way, the system 10 may be configured to allow a passenger to continue to utilize a second mobile device while restricting access of the operator to the first mobile device. Though discussed in reference to the first mobile device and the second mobile device, the system 10 may be configured to communicate with and operate in response to communications from any number of mobile devices. As discussed herein, the mobile devices are referred to as first, second, etc. for clarity and ease of identification in the description. However, such references shall not be considered limiting to the scope of the disclosure.

In some embodiments, the mobile device 20 may be configured to determine or authenticate the identity of a user. For example, the mobile device may similarly comprise a scanning apparatus or biometric detection device configured to identify a user. In such instances, the identification system 10 may be configured to identify the operator of the vehicle 8 and communicate the identity to the mobile device 20 instructing the mobile device 20 to restrict operation to the identified operator. The mobile device 20 may then determine whether a user corresponds to the operator of the vehicle 8 or another user and restrict the access or operation of the mobile device 20 to the operator while maintaining or granting usage of the mobile device 20 to the passenger or non-operating user. In this way, the identification device may limit or prohibit the operation of the mobile device 20 to the operator while still granting access to the passenger or non-operator user.

Figure 5:
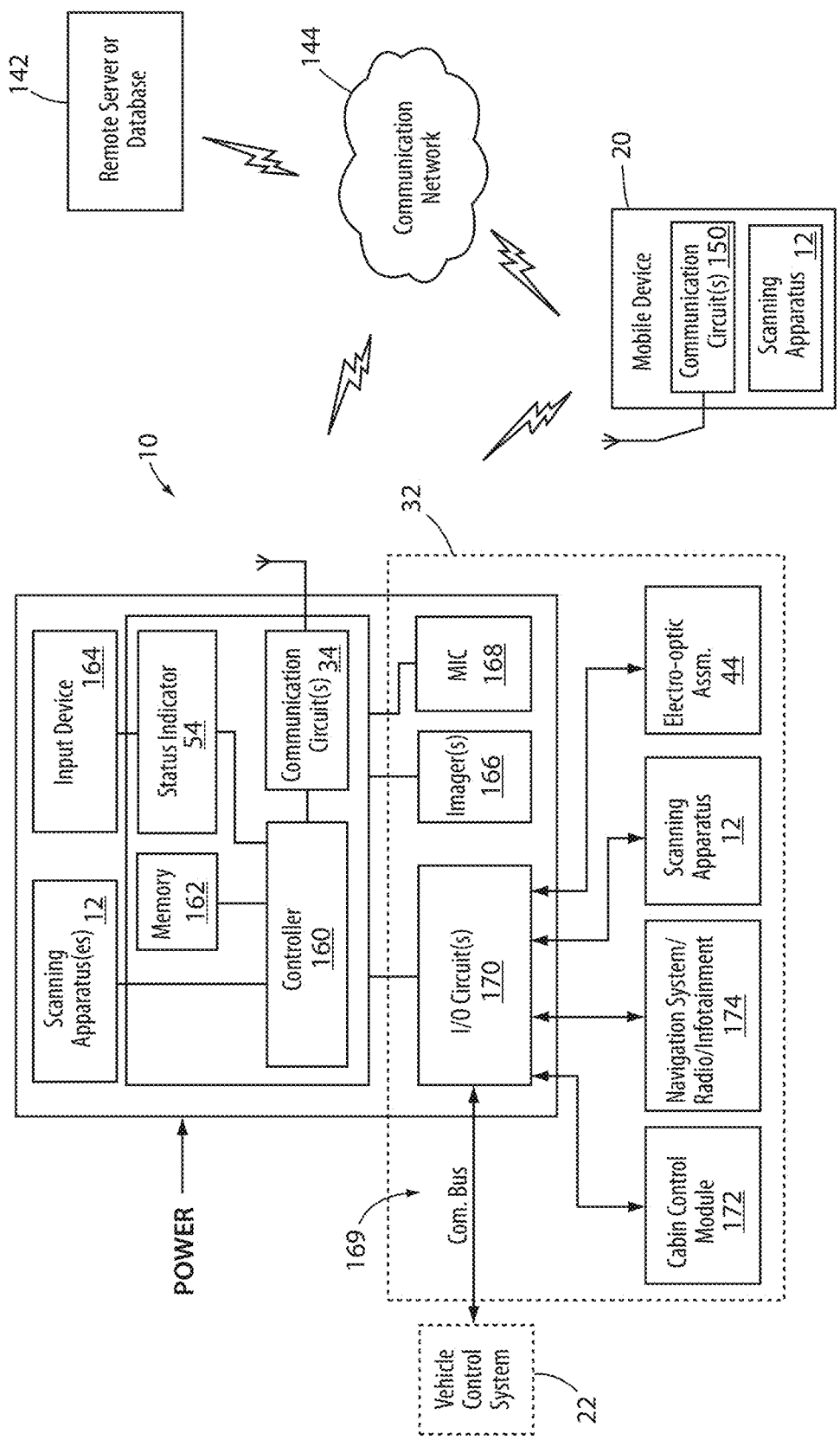
FIG. 5 is a block diagram of an identification system demonstrated in communication with a remote server or database in accordance with the disclosure.

Referring now to FIG. 5, a block diagram of the identification system 10 is shown in communication with a remote server 142 or database in accordance with the disclosure. The identification system 10 may incorporate or be in communication with various input devices, transducers, and/or sensors. Such devices may be commonly referred to herein as the scanning apparatus 12 or scanning apparatuses for clarity. The scanning apparatuses 12 may be configured to capture data and/or receive inputs from various vehicle systems and/or be configured to capture and communicate data with the identification system 10. The identification system 10 may then authenticate and determine an identity of the occupant 18 or operator of the vehicle 8 to control the mobile device 20. Additionally, in some embodiments, the identification of the occupant 18 may be utilized by the system 10 to access passenger preference settings, operating parameters, and/or administrative or operational privileges for the vehicle 8.

In an exemplary embodiment, the identification system 10 may comprise the one or more communication circuits 34 that may be configured to communicate with the mobile device 20, a remote server 142, and/or any device connected via a compatible communication network 144 or interface. The communication network 144 may correspond to various forms of wireless communication, for example, Bluetooth®, Bluetooth® Low-energy (BT-LE), Near Field Communication (NFC), and/or the like. Examples of standards related to NFC include ISO 18000-3, ISO 13157, and the like, and examples of standards related to BT-LE include IEEE 802.15.1, and the like. Additionally, the communication network 144 may be configured to operate using one or more of a plurality of radio access technologies including one or more of the following: Long-Term Evolution (LTE), wireless local area network (WLAN) technology, such as 802.11 Wi-Fi® and the like, and other radio technologies as well.

In implementations that utilize the mobile device 20 as a scanning apparatus 12 in an authentication process, the mobile device 20 may be operable to connect to a server, the internet, and/or a portal configured to receive an authentication. For example, the mobile device 20 may comprise one or more communication circuits 150 similar to those discussed herein to communicate with the remote server 142 to process or perform one or more of the authentication tasks or routines based on an identification profile. In various embodiments, the identification profile may be stored on the mobile device 20 and/or the remote server 142. In this configuration, the mobile device 20 may process or complete one or more of the authentication routines or methods discussed herein and communicate an authentication or identification profile to the identification system 10 to identify the occupant 18.

The identification system 10 may comprise a controller 160 configured to control various components and/or integrated circuits of the system 10. The controller 160 may include various types of control circuitry, digital and/or analog, and may include a microprocessor, microcontroller, application-specific integrated circuit (ASIC), or other circuitry configured to perform various input/output, control, analysis, and other functions to be described herein. The controller 160 may be in communication with a memory 162 configured to store one or more routines as discussed herein. The memory 162 may comprise a variety of volatile and non-volatile memory formats.

The controller 160 may be coupled to an input device 164, which may comprise one or more switches, but may, alternatively, include other user input devices, such as switches, knobs, dials, alpha or numeric input devices, etc. Additionally, the identification system 10 may comprise various data devices including, but not limited to, the input device 164, one or more imagers 166, a microphone 168, and various other sensors or inputs that may be implemented in the vehicle 8. Data received by each of the sensors or scanning apparatuses 12 may be processed by the controller 160 or the remote server 142 to identify or authenticate the occupant 18.

As discussed herein, the identification system 10 may be in communication with a variety of vehicle systems. For example, the identification system 10 is shown in communication with the vehicle control system 22 via a communication bus 169. Additionally, the controller 160 may be in communication with a plurality of vehicle systems via one or more input-output (I/O) circuits 170. For example, the identification system 10 may be in communication with a cabin control module 172 configured to adjust a seat position, comfort setting, and/or window setting corresponding to a control preference or setting of the occupant 18.

Still referring to FIG. 5, in some embodiments, the control system 10 may be in communication with one or more additional systems of the vehicle 8 via the I/O circuits 170. The I/O circuits 170 may be in communication with various devices or vehicle accessories. For example, the I/O circuits 170 may be in communication with a navigation system 174, one or more scanning apparatuses 12 and any other form of vehicle accessory or device incorporated in the vehicle 8. The controller 160 may receive location data from a global positioning system (GPS) module incorporated in the navigation system 174. Though described as a navigation system, the system may correspond to a radio, infotainment system, HMI, or a variety of guidance or entertainment systems that may be implemented in the vehicle 8. Accordingly, the identification system 10 may be operable to update various settings to customize various presets, themes, and settings that may be associated with various vehicle accessories as discussed herein.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. An identification system in communication with a control system of a vehicle, the identification system comprising:
    a communication circuit configured to communicate with a plurality of mobile devices;
    a rearview mirror assembly including at least one scanning apparatus configured to capture a biometric data; and
    a controller in communication with the communication circuit and the scanning apparatus, wherein the controller is configured to:
        control the scanning apparatus to capture the biometric data;

compare the biometric data to authentication data in an identification profile;

authenticate a vehicle operator based on the authentication data;

receive operating condition data corresponding to a vehicle gear selection;

receive occupant parameter data associated with the vehicle operator and the identification profile, wherein the occupant parameter data includes at least one of financial information related to a payment account and security information;

communicate a first control instruction to a first mobile device of the mobile devices associated with the vehicle operator via the communication circuit, wherein the first control instruction is configured to cause a restricted operation of the first mobile device based on the operating condition data and the occupant parameter data; and communicate a second control instruction to a second mobile device of the plurality of mobile devices, the second mobile device associated with a non-operator passenger of the vehicle, wherein the controller is configured to communicate an indication of the operator of the vehicle in the second control instruction, wherein the second control instruction is generated while the first mobile device is in the restricted operation.

2. The identification system according to claim 1, wherein the first control instruction is configured to cause the first mobile device to enter the restricted operation, and wherein the second control instruction is configured to cause the second device to operate in a different configuration from the restricted operation.

* * * * *